(12) United States Patent
Knoll et al.

(10) Patent No.: US 12,544,664 B2
(45) Date of Patent: Feb. 10, 2026

(54) MULTI-CLIENT CONTEXT SHARING FOR VIDEO STREAMING

(71) Applicant: ADVANCED MICRO DEVICES, INC., Santa Clara, CA (US)

(72) Inventors: Aaron Michael Knoll, Millcreek, UT (US); Binh Huy Le, Santa Clara, CA (US); Madhusudhanan Srinivasan, Austin, TX (US); Mark Richard Nutter, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 216 days.

(21) Appl. No.: 18/529,441

(22) Filed: Dec. 5, 2023

(65) Prior Publication Data

US 2025/0041721 A1 Feb. 6, 2025

Related U.S. Application Data

(60) Provisional application No. 63/530,540, filed on Aug. 3, 2023.

(51) Int. Cl.
*A63F 13/52* (2014.01)
*A63F 13/355* (2014.01)

(52) U.S. Cl.
CPC ............ *A63F 13/52* (2014.09); *A63F 13/355* (2014.09)

(58) Field of Classification Search
CPC ................................ A63F 13/52; A63F 13/355
See application file for complete search history.

(56) References Cited

U.S. PATENT DOCUMENTS

| | | | |
|---|---|---|---|
| 11,721,064 B1 * | 8/2023 | Aksoy | G06N 20/00 345/418 |
| 11,842,223 B2 * | 12/2023 | Chen | H04L 67/10 |
| 11,854,141 B2 | 12/2023 | Muthler et al. | |
| 2010/0309205 A1 | 12/2010 | Novosad | |
| 2018/0139257 A1 * | 5/2018 | Ninoles | H04L 65/1089 |
| 2021/0146240 A1 * | 5/2021 | Colenbrander | A63F 13/335 |
| 2021/0274347 A1 | 9/2021 | Dua | |
| 2021/0362051 A1 * | 11/2021 | Perry | A63F 13/30 |
| 2022/0005256 A1 | 1/2022 | Hughes et al. | |
| 2022/0138988 A1 | 5/2022 | Stengel et al. | |
| 2022/0198739 A1 | 6/2022 | Saleh et al. | |
| 2022/0254093 A1 | 8/2022 | Zheng et al. | |
| 2022/0394072 A1 * | 12/2022 | Aristarkhov | H04N 19/176 |
| 2023/0169713 A1 | 6/2023 | Yoon et al. | |

(Continued)

FOREIGN PATENT DOCUMENTS

EP 3833032 B1 5/2025

OTHER PUBLICATIONS

U.S. Appl. No. 18/751,915, filed Jun. 24, 2024, listing Aaron Michael Knoll et al. as inventor, entitled "Parallel Multi-Client Ray Tracing Task Processing".

(Continued)

*Primary Examiner* — Reginald A Renwick

(57) ABSTRACT

A server employs a shared raytracing context to generate video streams for multiple client devices. The server uses the shared raytracing context to perform raytracing operations for each of the client devices, and based on the raytracing operations generates different sets of image frames. The server then streams each set of image frames to a corresponding client device over a network.

20 Claims, 6 Drawing Sheets

(56) References Cited

U.S. PATENT DOCUMENTS

2023/0260195 A1     8/2023   Wald
2024/0390800 A1*   11/2024   Spratt ................. A63F 13/49

OTHER PUBLICATIONS

Van Antwerpen et al. "Improving SIMD efficiency for parallel Monte Carlo light transport on the GPU." In Proceedings of the ACM SIGGRAPH Symposium on High Performance Graphics (HPG '11). Association for Computing Machinery, New York, NY, USA, 2011, pp. 41-50. https://doi.org/10.1145/2018323.2018330.

Clamchowder, "Shader Execution Reordering—NVIDIA tackles divergence," Chips and Cheese, 2023, <https://chipsandcheese.com/2023/05/16/shader-execution-reordering-nvidia-tackles-divergence/>, Accessed Sep. 10, 2024, 16 pages.

NVIDIA, "NVIDIA Ada Lovelace Architecture" <https://www.nvidia.com/en-us/geforce/ada-lovelace-architecture/>, Accessed Sep. 10, 2024, 6 pages.

Laine et al., "Megakernels considered harmful: Wavefront path tracing on GPUs," In Proceedings of the 5th High-Performance Graphics Conference Jul. 19, 2013 (pp. 137-143). 7 pages. doi:https://doi.org/10.1145/2492045.2492060.

Aila et al., "Understanding the Efficiency of Ray Traversal on GPUs," HPG 2009 <https://research.nvidia.com/sites/default/files/pubs/2009-08_Understanding-the-Efficiency/aila2009hpg_paper.pdf>, Accessed Sep. 10, 2024, 5 pages.

Fouladi et al., "R2E2: Low-Latency Path Tracing of Terabyte-Scale Scenes using Thousands of Cloud CPUs" ACM Trans. Graph., vol. 41, No. 4, Article 1, 2022, 14 pages.

Wald et al., "HPG 22, Data Parallel Path Tracing in Object Space" arXiv:2204.10170v1 [cs.GR], published Apr. 21, 2022, <arXiv:2204.10170v1>, Accessed Apr. 24, 2024, 8 pages.

Xie et al., "Real Time Cluster Path Tracing" arXiv:2110.08913v2 [cs.GR], published Oct. 21, 2021, <arXiv:2110.08913v2>, Accessed Apr. 24, 2024, 5 pages.

Jaros et al. "GPU Accelerated Path Tracing of Massive Scenes," ACM Transactions on Graphics, vol. 40, No. 2, Article 16: 2021, 17 pages.

NVIDIA Corp., "NVIDIA Omniverse" <https://developer.nvidia.com/nvidia-omniverse-platform>, Accessed Apr. 24, 2024, 13 pages.

Amazon Inc., "Amazon Luna." <https://www.amazon.com/luna/landing-page> Accessed Apr. 24, 2024, 7 pages.

Xbox Inc., "Xbox Cloud Gaming." <https://www.xbox.com/en-us/play> Accessed Apr. 24, 2024, 3 pages.

AMD Inc., "AMD Radeon Pro Render." <https://www.amd.com/en/technologies/radeon-prorender> Accessed Apr. 24, 2024, 18 pages.

AMD Inc., "AMD Advanced Media Framework SDK" <https://gpuopen.com/advanced-media-framework/> Accessed Apr. 24, 2024, 3 pages.

International Search Report and Written Opinion issued in Application No. PCT/US2024/039251, mailed Nov. 11, 2024, 9 pages.

International Search Report and Written Opinion mailed Oct. 27, 2025 for International Application No. PCT/US2025/034567, 11 pages.

\* cited by examiner

MULTI-CLIENT CONTEXT SHARING FOR VIDEO STREAMING

BACKGROUND

Streaming video has become an increasingly popular way to deliver content to user. For example, streaming game content from a server to one or more client devices over a network allows for the delivery of sophisticated or complex images without requiring each client device to have powerful image generating hardware, such as a game console or computer with a powerful graphics processing unit (GPU). To increase efficiency, each server of a typical game content or other streaming system streams video content to multiple clients. Conventionally, this multi-client streaming is implemented via an instanced computing environment, where each client device is assigned a separate program instance (e.g., separate game instance) that generates the corresponding video stream for the client device. However, this approach consumes a high amount of server resources, particularly as the number of client devices increases.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate systems and techniques for employing a shared raytracing context at a server to generate video streams for multiple client devices. The server uses the shared raytracing context to perform raytracing operations for each of the client devices, and based on the raytracing operations generates different sets of image frames. The server then streams each set of image frames to a corresponding client device over a network. By employing a shared raytracing context, the server conserves memory, compute resources, and power while generating video content for the multiple client devices.

To illustrate via an example, a game streaming system is generally configured to include a server that executes a game program. The game program receives input data from a client device over a network, and based on the input data sends commands to a GPU of the server to generate image frames. At least some of these commands instruct the GPU to perform raytracing operations based on a raytracing context. For example, in some cases the raytracing context includes a bounding volume hierarchy (BVH), and the game program issues commands for the GPU to perform traversal operations—that is, commands for the GPU to traverse the BVH in order to identify the intersection of rays with one or more objects of a scene. Based on the traversal of the BVH and the identified ray intersections, the GPU generates one or more image frames, and the server streams (sends) the image frames to the client device over the network.

To use the resources of the server efficiently, it is useful for the server to generate and stream image frames for multiple client devices. Conventionally, this is done by the server employing a separate game program instance, and corresponding graphics context, for each client device. For example, some servers implement a virtualized computing environment, wherein the server executes a different virtual machine (VM) for each client device. Each VM executes a different instance of the game program, and each of the different game program instances employs a separate copy of the raytracing context, including a different copy of the BVH. This results in a relatively high consumption of resources at the server, including a high number of memory resources to store the separate copies of the BVH.

Figure 1:
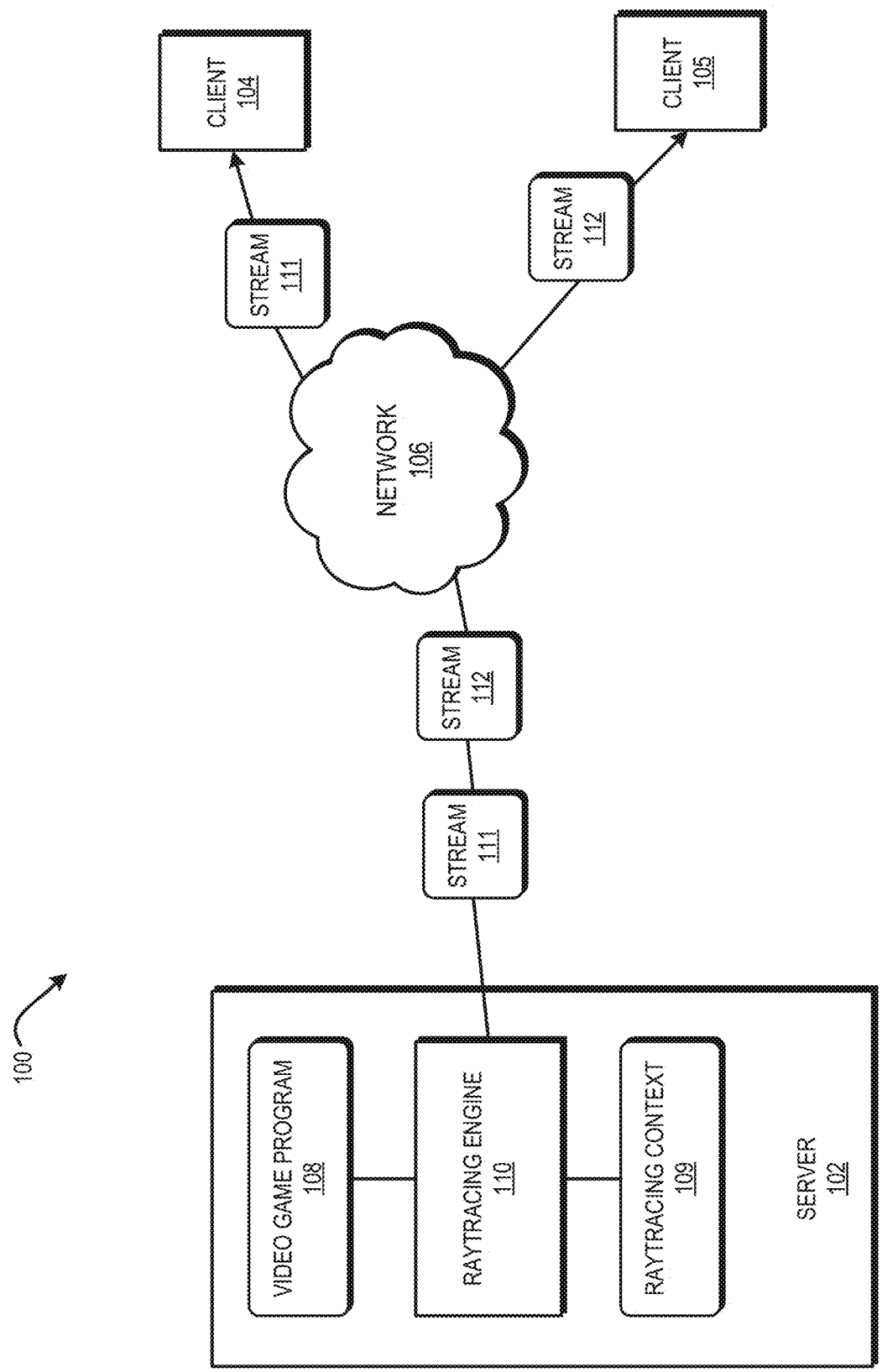
FIG. 1 is a block diagram of a video streaming system that shares a raytracing context among multiple client devices in accordance with some embodiments.

Using the techniques and systems described herein, a game streaming system or other video streaming system employs a single graphics context, including one or more of a BVH FIG. 1 illustrates a cloud-based system 100 employing a shared raytracing context in accordance with some embodiments. The system 100 includes a cloud service composed of one or more servers 102 connected to client devices 104 and 105 via one or more networks 106. The client devices 104 and 105 in turn include, or are otherwise connected to, corresponding display devices. The cloud service can include any of a variety of cloud-based services that provide streamed multimedia content to the client devices 104 and 105. One example of such a service includes cloud-based video gaming, and the system 100 is described in further detail herein with reference to this example for ease of illustration. However, it will be appreciated that the techniques described herein are not limited to cloud-based video gaming services, but instead is implementable for any of a variety of systems in which rendered video streams are remotely generated and transmitted to the client devices 104 and 105.

The one or more servers 102 of the cloud service comprise one or more servers co-located at the same server site or one or more servers located at geographically separated server sites. For purposes of illustration, the functionality implemented at the server-side of the system 100 is described in the context of a single server 102 performing the corresponding functionality. However, it will be appreciated that in some implementations, the functionality is distributed among multiple servers 102. The one or more networks 106 can comprise one or more wired or wireless wide area networks (WANs), such as the Internet, one or more wired or wireless local area networks (LANs), one or more cellular networks, or a combination thereof. The client device 104 can include any of a variety of user electronic devices used for receipt and display of encoded video streams, such as a laptop computer, desktop computer, tablet computer, smart phone, smart watch, video game console, vehicle entertainment system, network-connected appliance, and the like.

As a general operational interview, the server 102 operates to render a sequence of video frames, process this sequence to generate streams of rendered video frames, concurrently encode the streams to generate encoded streams 111 and 112 that are transmitted to the client devices 104 and 105, respectively, via the one or more networks 106. As the encoded streams 111 and 112 are received, the client devices 104 and 105 decode the encoded streams 111 and 112, respectively to recover the unencoded stream of rendered video frames and then provides a representation of the resulting stream of rendered video frames for display at the corresponding display device. To illustrate, in a cloud-based gaming context, the server 102 executes an instance of a video game program 108 that renders a stream of video frames based on gameplay controlled by user input received in parallel from the client device 104. This stream is encoded at the server 102, and the encoded video game video stream 111 is transmitted to the client device 104 for decoding and display at the client device 104. Similarly, the server 102 executes an instance of the video game program 108 that renders a stream of video frames based on gameplay controlled by user input received in parallel from the client device 105. The server 102 encodes the stream and the encoded video game video stream 112 is transmitted to the client device 105 for decoding and display at the client device 105.

Video game applications or other applications that generate rendered graphical content and which are executed by the server 102 typically employ one or more 2D or 3D graphics effects implemented via execution of corresponding graphics effects operations, including raytracing operations. To facilitate execution of these raytracing operations, the server 102 includes a raytracing engine 110. In some embodiments, the raytracing engine 110 is circuitry configured to perform raytracing operations, such as ray casting, path tracing, BVH traversal, denoising filtering, and the like, or any combination thereof. Such circuitry, in at least some embodiments, is any one of, or a combination of, a hard-coded circuit (e.g., a corresponding portion of an application specific integrated circuit (ASIC) or a set of logic gates, storage elements, and other components selected and arranged to execute the ascribed operations) or a programmable circuit (e.g., a corresponding portion of a field programmable gate array (FPGA) or programmable logic device (PLD)). In some embodiments, one or more of the operations of the raytracing engine 110 are executed by software instructions that manipulate one or more processing elements (e.g., processor cores, compute units, and the like) to perform the corresponding operations.

To execute these raytracing operations, the raytracing engine employs a raytracing context 109. The raytracing context 109 is one or more data structures that stores information used by the rendering engine to perform raytracing operations. For example, in some embodiments, the raytracing context 109 includes one or more of a scene graph for a scene associated with the video game program, a BVH employed by the rendering engine 110 to accelerate identification of ray intersections with objects indicated by the scene graph, geometry and texture information for objects in the scene, and the like or any combination thereof. Conventionally a server employs a different raytracing context to perform raytracing operations for different client devices, and thereby generate the different video streams for the client devices. However, maintaining a separate copy of the raytracing context consumes a relatively high amount of system resources, such as memory and power. Furthermore, in some cases the different raytracing context for the different clients are substantially the same or store the same information. For example, in some cases the raytracing context represents the object of a game world, or a portion thereof, for a game program, and different client devices interact with that same game world or portion. In these cases, the raytracing context for each of the client devices is substantially the same, and therefore the multiple copies of the raytracing contexts consume system resources without providing a corresponding benefit.

Accordingly, to mitigate the consumption of resources, in at least one embodiment the server 102 uses the raytracing context 109 to generate both of the streams 111 and 112. That is, the server 102 employs the raytracing engine 110 to perform raytracing operations for both the client 104 and the client 105 using the same raytracing context 109. Based on the corresponding raytracing operations, the server 102 renders the video frames for the streams 111 and 112. Because the server 102 uses the same raytracing context 109 to generate both the streams 111 and 112, the server 102 does not have to maintain different copies of a raytracing context for each client device, nor does the server 102 perform context switches when changing between client streams at the server 102. The server 102 is thus able to generate both the stream 111 and the stream 112 using fewer memory and other system resources.

Figure 2:
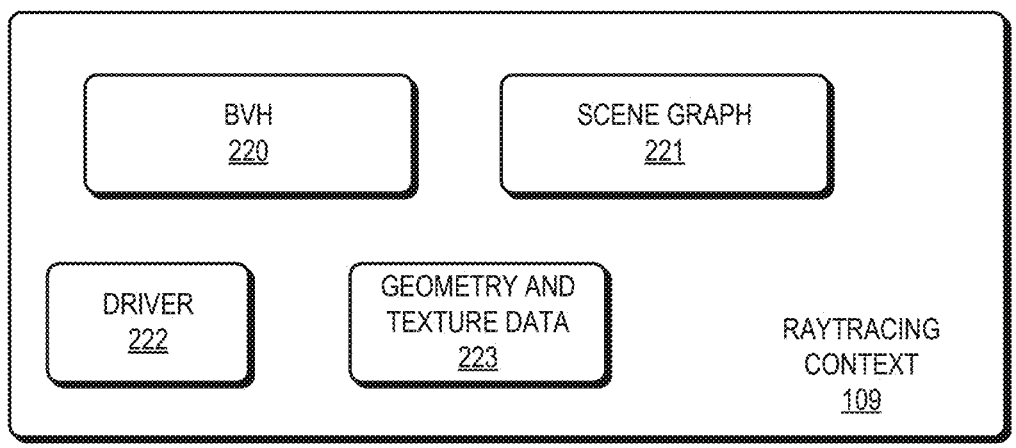
FIG. 2 is a block diagram of the raytracing context of FIG. 1 in accordance with some embodiments.

FIG. 2 illustrates an example of the raytracing context 109 in accordance with some embodiments. In the depicted example, the raytracing context 109 includes a BVH 220, a scene graph 2221, a driver 222, and geometry and texture data 223. The scene graph 221 is a data structure that encodes objects of a scene or environment. The scene graph 221 encodes the objects as nodes connected via pairwise relationships as edges. For example, in some embodiments the video game program 108 implements a virtual game "world" or environment, wherein the environment includes a set of graphical objects, and the scene graph 221 encodes the objects of the environment as nodes, and the relationships between the objects. For example, in some embodiments the scene graph 221 maintains the position, animated state, and other characteristics of actors or other game objects. In some embodiments, the raytracing engine 110 uses the scene graph 221 to perform raytracing operations, or portions thereof. For example, in some embodiments, the raytracing engine 110 performs selected raytracing operations, or portions thereof, by traversing the scene graph 221 to, for example, transform one or more rays, construct one or more acceleration structures such as the BVH 220, and the like. The driver 222 is a software module (that is, a set of instructions executed at a processor) that provides an interface between the hardware of the raytracing engine 110 and other software.

The geometry and texture data 223 is one or more data structures that store information indicating the geometry and texture of objects in a scene or environment. For example, in some embodiments the geometry and texture data 223 stores geometry and texture information for one or more of the objects represented in the scene graph 221. The raytracing engine 110 employs the geometry and texture data to perform designated raytracing operations. For example, in some cases the raytracing engine 110 executes operations that calculate how a ray reflects off a designated object, and these calculations depend upon the shape (that is, the geometry) and texture of the object. Accordingly, to perform these reflection operations, the raytracing engine 110 employs the geometry and texture data 223.

The BVH 220 is a data structure that represents a set of geometric objects within a scene to be rendered. The geometric objects (e.g., triangles or other primitives) are enclosed in bounding boxes or other bounding volumes that form leaf nodes of the BVH 220, and then these nodes are grouped into sets, with each set enclosed in its own bounding volume that is represented by a parent node on the tree structure, and these sets then are bound into larger sets that are similarly enclosed in their own bounding volumes that represent a higher parent node on the tree structure, and so forth, until there is a single bounding volume representing the top node of the BVH 220 and which encompasses all lower-level bounding volumes.

To perform some ray tracing operations, the raytracing engine 110 uses the BVH 220 to identify potential intersections between generated rays and the geometric objects in the scene by traversing the nodes of the tree, where at each node being traversed the raytracing engine 110 compares a ray of interest with the bounding volume of that node to determine if there is an intersection, and if so, continuing on to a next node in the tree, where the next node is identified based on the traversal algorithm, and so forth.

Figure 3:
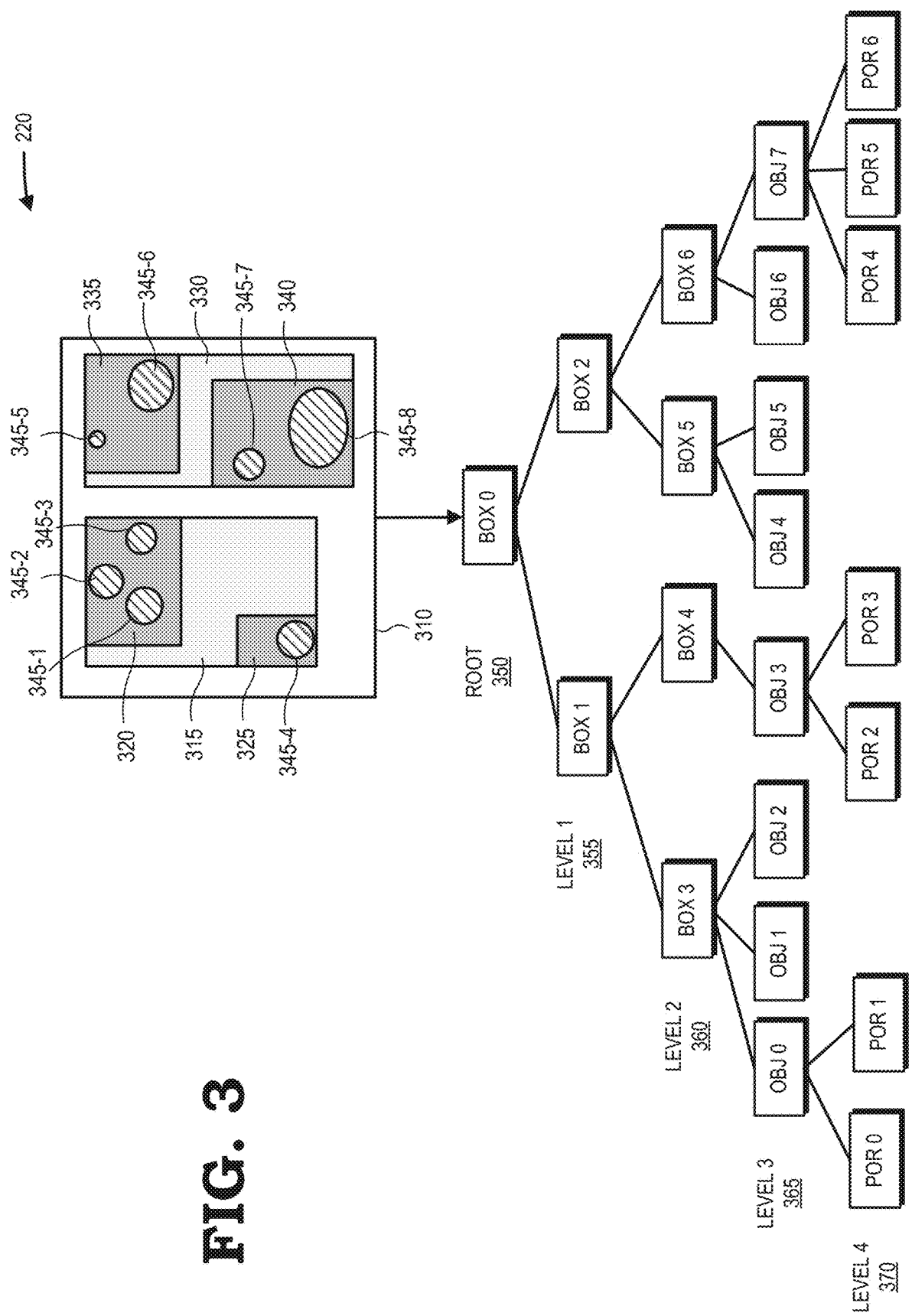
FIG. 3 is a diagram of a bounding volume hierarchy (BVH) of the raytracing context of FIG. 1 in accordance with some embodiments.

An example of the BVH 220 is illustrated at FIG. 3 in accordance with some embodiments. In embodiments, example BVH 220 includes data representing one or more graphics objects 345 of a scene to be rendered in screen space 310 (e.g., a display space). As an example, acceleration structure 300 includes levels of nodes representing hierarchically arranged bounding boxes, bounding volumes, or both that each encompasses one or more graphics objects 345, portions of one or more graphics objects (e.g., meshlets), or both within the scene to be rendered in a screen space 310. Such graphics objects 345, for example, each include data representing a set of primitives within a scene. Though the example embodiment of FIG. 3 presents the scene in screen space 310 as having eight graphics objects (345-1, 345-2, 345-3, 345-4, 345-5, 345-6, 345-7, 345-8), in other embodiments, the scene in screen space 310 can have any number of graphics objects 345.

According to embodiments, to represent one or more graphics objects 345 of a scene to be rendered in screen space 310, acceleration structure 300 includes a data structure having two or more hierarchical levels that each include a number of nodes. As an example, acceleration structure 300 includes a first hierarchical level (e.g., root 350) that includes a single node (e.g., Box 0) that represents all the graphics objects (345-1, 345-2, 345-3, 345-4, 345-5, 345-6, 345-7, 345-8) in screen space 310. Further, acceleration structure 300 includes a second level (e.g., level 1 355) that includes a first node (e.g., Box 1) and a second node (e.g., Box 2) each connected to the node (e.g., Box 0) of the first hierarchical level. The nodes of the second level (e.g., level 1 355) together represent a first set of bounding boxes 315, 330 in screen space 310 encompassing the graphics objects 345. For example, a first node (e.g., Box 1) of the second hierarchical level (e.g., level 1 355) represents a first bounding box 315 encompassing the graphics objects 345-1, 345-2, 345-3, 345-4 and a second node (e.g., Box 2) of the second hierarchical level represents a second bounding box 330 encompassing the graphics objects 345-5, 345-6, 345-7, 345-8. In embodiments, acceleration structure 300 also includes a third hierarchical level (e.g., level 2 360) that includes a first node (e.g., Box 3), second node (e.g., Box 4), third node (e.g., Box 5), and a fourth node (e.g., Box 6) each connected to respective nodes of the second hierarchical level. The nodes of the third level (e.g., level 2 360) together represent a second set of bounding boxes 320, 325, 335, 340 in screen space 310 encompassing the graphics objects 345. For example, a first node (e.g., Box 3) of the third hierarchical level (e.g., level 2 360) represents a third bounding box 320 encompassing the graphics objects 345-1, 345-2, 345-3, a second node (e.g., Box 4) of the third hierarchical level represents a fourth bounding box 325 encompassing graphics object 345-4, a third node (e.g., Box 5) of the third hierarchical level represents a fifth bounding box 335 encompassing the graphics objects 345-5, 345-6, and a fourth node (e.g., Box 6) of the third hierarchical level represents a sixth bounding box 340 encompassing the graphics objects 345-7, 345-8.

Additionally, according to embodiments, acceleration structure 300 includes a fourth hierarchical level (e.g., level 3 365) that includes nodes each connected to a respective node of the third hierarchical level. For example, the fourth hierarchical level (e.g., level 3 365) includes a first node (e.g., OBJ 0) representing graphics object 345-1, a second node (e.g., OBJ 1) representing graphics object 345-2, a third node (e.g., OBJ 2) representing graphics object 345-3, a fourth node (e.g., OBJ 3) representing graphics object 345-4, a fifth node (e.g., OBJ 4) representing graphics object 345-5, a sixth node (e.g., OBJ 5) representing graphics object 345-6, a seventh node (e.g., OBJ 6) representing graphics object 345-7, and an eighth node (e.g., OBJ 7) representing graphics object 345-8. Further, in some embodiments, acceleration structure 300 includes a fifth hierarchical level (e.g., level 4 370) that includes nodes (e.g., sub-nodes) each representing a respective portion (e.g., meshlet) of a graphics object 345 represented by a node of the fourth hierarchical level (e.g., level 3 365). As an example, a first node (e.g., POR 0) of the fifth hierarchical level (e.g., level 4 370) represents a first portion (e.g., meshlet) of graphics object 345-1, a second node (e.g., POR 1) of the fifth hierarchical level represents a second portion of graphics object 345-1 different from the first portion of graphics object 345-1, a third node (e.g., POR 2) of the fifth hierarchical level represents a first portion of graphics object 345-4, a fourth node (e.g., POR 3) of the fifth hierarchical level represents a second portion of graphics object 345-4 different from the first portion of graphics object 345-4, a fifth node (e.g., POR 4) of the fifth hierarchical level represents a first portion of graphics object 345-8, a sixth node (e.g., POR 5) of the fifth hierarchical level represents a second portion of graphics object 345-8 different from the first portion of graphics object 345-8, and a seventh node (e.g., POR 6) of the fifth hierarchical level represents a third portion of graphics object 345-8 different from the first and second portions of graphics object 345-8. To perform one or more specified raytracing operations, the raytracing engine 110 traverses the BVH 220 by testing a ray for intersection with an initial node (e.g. BOX 0), in response to identifying an intersection with the root node, testing the ray for intersection with the child nodes (e.g., the nodes of LEVEL 1), in response to identifying an intersection with one or more of the child nodes, testing the ray for intersection with the child nodes of the intersected nodes, and so on.

Figure 4:
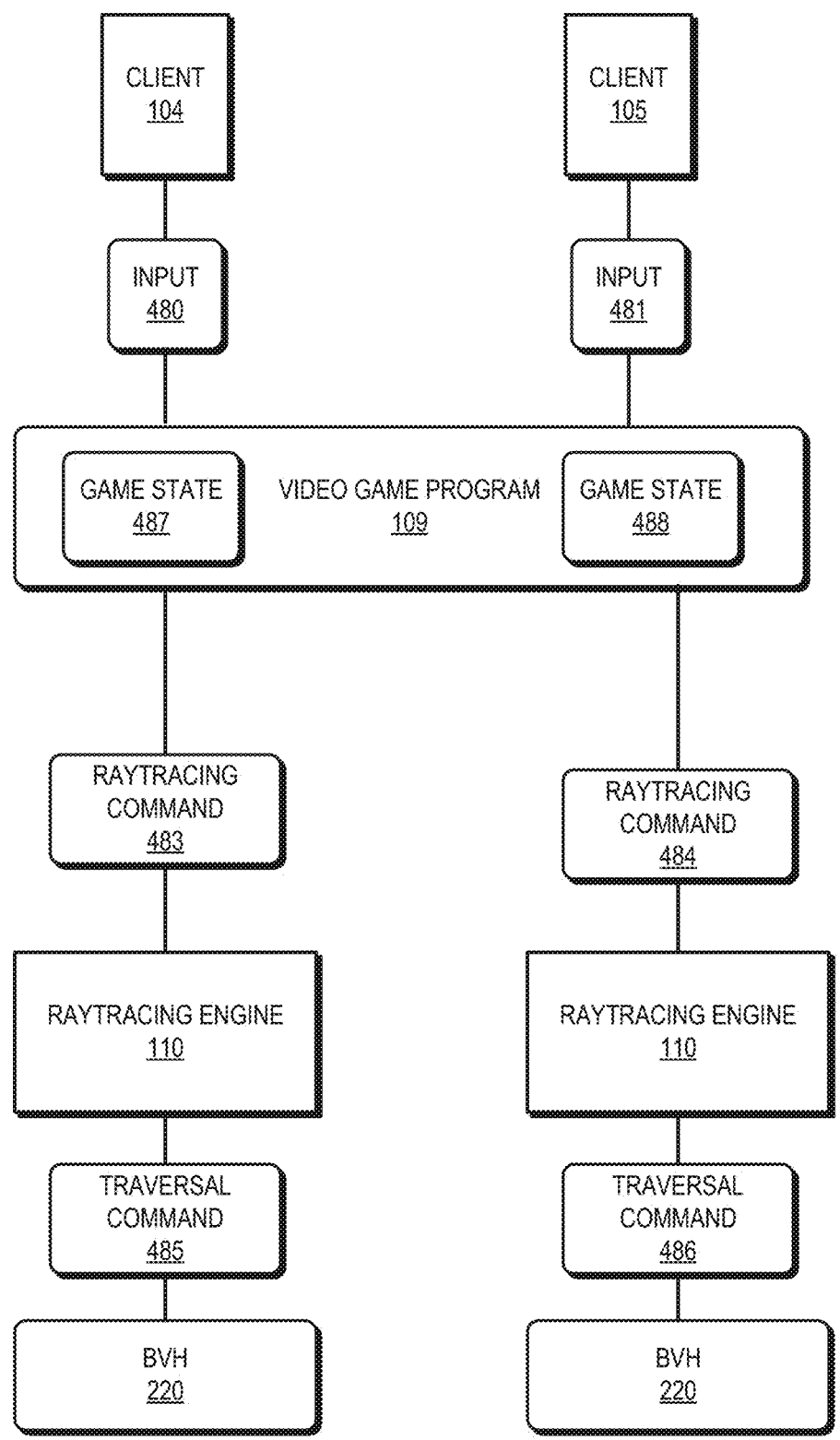
FIG. 4 is a block diagram illustrating an example of the video streaming system of FIG. 1 employing the same raytracing context for multiple client devices in accordance with some embodiments.

FIG. 4 illustrates a block diagram of an example of the system 100 employing the raytracing context 109, and in particular the BVH 220, to perform raytracing operations for both the client 104. In the depicted example, the video game program 108 maintains a game state 487, representing state information for a player of the video game that is using the client device 104. In addition, the video game program 108 maintains a game state 488 for a player of the video game that is using the client device 105.

Over the one or more networks 106, the video game program receives input data 480 and input data 481 from the client devices 104 and 105 respectively. The input data 480 and 481 represent the respective interactions of the players with the game at the client devices 104 and 105 respectively, and are based on keyboard inputs, mouse inputs, voice inputs, game controller inputs, and the like. Furthermore, in at least some cases the input data 480 is different from the input data 481, as the respective players interact with the game differently.

Based on the input data 480, the video game program 108 modifies the game state 487. For example, in some cases the input data 480 indicates that a game character changes position in a game world, and the video game program 108 modifies the game state 487 to indicate the updated position of the game character. Similarly, based on the input data 481 the video game program 108 modifies the game state 488. Because the input data 481 differs, at least in some cases, from the input data 480, the game state 488 is different from the game state 487. For example, in some cases the position of the game character indicated by game state 487 is different from the position of the same game character indicated by game state 488.

In some cases, a change in a game state causes the video game program 108 to request the server 102 to generate new or updated video frames for streaming. For example, an update to a character position in some cases causes the video game program 108 to request video frames showing an updated view for the character. Furthermore, to generate the new or updated frames, in some cases the video game program issues one or more raytracing operations. Thus, in the example of FIG. 4, in response to the input 480 and a corresponding change in the game state 487, the video game program 108 issues a raytracing command 483 to instruct the raytracing engine 110 to perform a specified raytracing operation. Similarly, in response to the input 481 and a corresponding change in the game state 488, the video game program 108 issues a raytracing command 484 to instruct the raytracing engine 110 to perform a specified raytracing operation.

In at least some embodiments, because the game states 487 and 488 differ, the raytracing commands 483 and 484 also differ. For example, in some embodiments, parameters of the raytracing command 483 indicate or are based on the position of a game character indicated by the game state 487, and the parameters of the raytracing command 483 indicate or are based on the position of a game character indicated by the game state 488. When the positions of the game characters indicated by the game states 487 and 488 differ, the raytracing commands 483 and 484 also differ, as each raytracing command 483 and 484 is based on the respective character's position and viewpoint of a corresponding game environment.

To execute the raytracing command 483, the raytracing engine 110 issues a traversal command 485 to cause a traversal of the BVH 220, and in particular to test a set of one or more rays for intersection with a set of objects of a game environment. Similarly, based on the raytracing command 484, the raytracing engine 110 issues a traversal command 486 cause a traversal of the BVH 220, and in particular to test a set of one or more rays for intersection with a set of objects of a game environment. The set of rays tested by the traversal commands 485 and 486 are based on the game states 487 and 488 respectively, and thus in at least some cases are different. For example, in some embodiments the set of rays tested for intersection by the traversal commands 485 and 486 are based on the respective character positions or viewpoints indicated by the game states 487 and 488, respectively.

Based on the results of the traversal commands 485 and 486, the server 102 generates the streams 111 and 112, respectively. In at least some cases, the results of the traversal commands 485 and 486 are different, and therefore the streams 111 and 112 are different (that is, the stream 111 includes one or more video frames having different image data than the stream 112). Thus, in the example of FIG. 3, the system 100 employs the same raytracing context 109, and in particular the same BVH 220, to generate streams of video frames for the different client devices 104 and 105. Furthermore, the system 100 employs the same raytracing context 109 even when a game state (or other program state) for the clients 104 and 105 differ. In other words, the system 100 employs the same raytracing context 109 to generate video frames for different clients that provide different input data and generate different game states, resulting in different video frames being generated for the streams 111 and 112.

Figure 5:
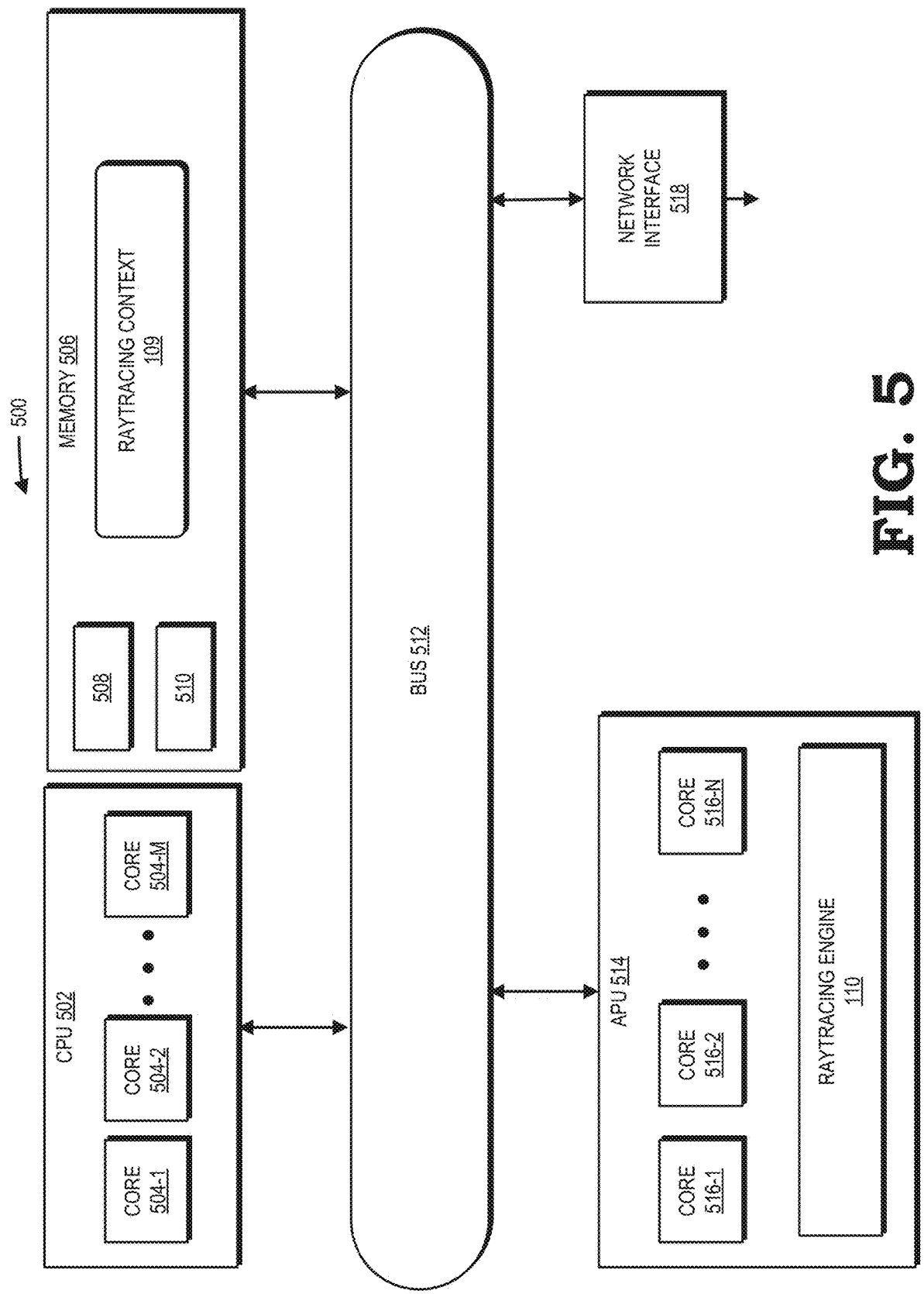
FIG. 5 is a block diagram of a processing system that implements a server of the video streaming system of FIG. 1 in accordance with some embodiments.

FIG. 5 illustrates an example of a processing system 500 that implements the server 102, and in particular is configured to generate video streams for communication to multiple client devices based on the graphics context 109. To this end, the processing system 500 includes or has access to a memory 506 or other storage component implemented using a non-transitory computer-readable medium, for example, a dynamic random-access memory (DRAM). However, in implementations, the memory 506 is implemented using other types of memory including, for example, static random-access memory (SRAM), nonvolatile RAM, and the like. According to implementations, the memory 506 includes an external memory implemented external to the processing units implemented in the processing system 500. The processing system 500 also includes a bus 512 to support communication between entities implemented in the processing system 500, such as the memory 506. Some implementations of the processing system 500 include other buses, bridges, switches, routers, and the like, which are not shown in FIG. 5 in the interest of clarity.

The techniques described herein are, in different implementations, employed at accelerated processing unit (APU) 114. APU 514 includes, for example, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. The APU 514 renders scenes within a screen space (e.g., the space in which a scene is displayed) according to one or more applications 510 for streaming to one or more client devices. For example, the APU 514 renders graphics objects (e.g., sets of primitives) of a scene in a screen space (e.g., display space) to be displayed to produce values of pixels in the form of video frames, and the video frames are provided to a network interface 518 that communicates the video frames to the corresponding client devices 104 and 105 over the one or more networks 106. To render these graphics objects, the APU 514 implements a plurality of processor cores 516-1 to 516-N that execute instructions concurrently or in parallel. For example, the APU 514 executes instructions from one or more graphics pipelines using a plurality of processor cores 516 to render one or more graphics objects. A graphics pipeline includes, for example, one or more steps, stages, or instructions to be performed by APU 514 in order to render one or more graphics objects for a scene. As an example, a graphics pipeline includes data indicating an assembler stage, vertex shader stage, hull shader stage, tessellator stage, domain shader stage, geometry shader stage, binner stage, rasterizer stage, pixel shader stage, output merger stage, or any combination thereof to be performed by one or more processor cores 116 of APU 514 in order to render one or more graphics objects for a scene. In some embodiments, one or more stages of the graphics pipeline includes, or employs, the raytracing engine 110 to perform raytracing operations, including operations based on the raytracing context 109.

In embodiments, one or more processor cores 116 of APU 514 each operate as a compute unit configured to perform one or more operations for one or more instructions received by APU 514. These compute units each include one or more single instruction, multiple data (SIMD) units that perform the same operation on different data sets to produce one or more results. For example, APU 514 includes one or more processor cores 116 each functioning as a compute unit that includes one or more SIMD units to perform operations for one or more instructions from a graphics pipeline 124. To facilitate one or compute units performing operations for instructions from a graphics pipeline 124, APU 514 includes one or more command processors (not shown for clarity). Such command processors, for example, include hardware-based circuitry, software-based circuitry, or both configured to execute one or more instructions from a graphics pipeline by providing data indicating one or more operations, operands, instructions, variables, register files, or any combination thereof to one or more compute units necessary for, helpful for, or aiding in the performance of one or more operations for the instructions. Though the example implementation illustrated in FIG. 1 presents APU 514 as having three processor cores (516-1, 516-2, 516-N) representing an N number of cores, the number of processor cores 516 implemented in the APU 514 is a matter of design choice. As such, in other implementations, the APU 514 can include any number of processor cores 516. Some implementations of the APU 514 are used for general-purpose computing. For example, the APU 514 executes instructions such as program code 508 for one or more applications 510 stored in the memory 506 and the APU 514 stores information in the memory 506 such as the results of the executed instructions. The memory 506 also stores the raytracing context 109 for use by the raytracing engine 110.

In some embodiments, APU 514 is configured to perform raytracing and other graphics operations. To facilitate the performance of such operations for instructions of a graphics pipeline, each graphics core of APU 514 is associated with (e.g., communicatively coupled to) a respective command processor of APU 514 configured to provide data (e.g., operations, operands, instructions, variables, register files) to one or more compute units of a graphics core necessary for, helpful for, or aiding in the performance of the operations for a respective set of instructions. Because each graphics core is associated with a respective command processor configured to provide data based on a respective set of instructions, the graphics cores are enabled to render different graphics objects at different times. That is to say, two or more graphics cores are configured to concurrently render different graphics objects such that, for example, a first graphics core renders a first graphics object and a second graphics core concurrently renders a second graphics object different from the first graphics object.

According to embodiments, to generate video frames for streaming, the graphics cores of APU 514 are configured to generate raytracing commands for the raytracing engine 110. In response to the raytracing commands, the raytracing engine 110 employs the data structures of the raytracing context 109 to execute one or more raytracing operations. Such data structures, for example, each include levels of nodes representing hierarchically arranged bounding boxes, bounding volumes, or both that each encompasses one or more graphics objects (e.g., sets of triangles or other primitives), portions of one or more graphics objects (e.g., meshlets), or both within a scene to be rendered in a screen space. As an example, in some embodiments the raytracing context 109 includes a BVH (e.g., BVH 220) representing two or more hierarchically arranged bounding volumes that each encompass graphics objects, portions of graphics objects, or both of a scene to be rendered within a screen space. As another example, in some embodiments the raytracing context 109 includes, in addition to or instead of the BVH, a scene graph, a device driver, geometry and texture data, or any combination thereof.

The processing system 500 also includes a central processing unit (CPU) 502 that is connected to the bus 512 and therefore communicates with the APU 514 and the memory 506 via the bus 512. The CPU 502 implements a plurality of processor cores 504-1 to 504-N that execute instructions concurrently or in parallel. Though in the example implementation illustrated in FIG. 1, three processor cores (504-1, 504-2, 504-M) are presented representing an M number of cores, the number of processor cores 504 implemented in the CPU 502 is a matter of design choice. As such, in other implementations, the CPU 502 can include any number of processor cores 504. In some implementations, the CPU 502 and APU 514 have an equal number of processor cores 504, 516 while in other implementations, the CPU 502 and APU 514 have a different number of processor cores 504, 516. The processor cores 504 execute instructions such as program code 508 for one or more applications 510 (e.g., video game program 108) stored in the memory 506 and the CPU 502 stores information in the memory 506 such as the results of the executed instructions. The CPU 502 is also able to initiate graphics processing, including one or more raytracing operations, by issuing commands (e.g., draw calls) to the APU 514 via the bus 512.

Figure 6:
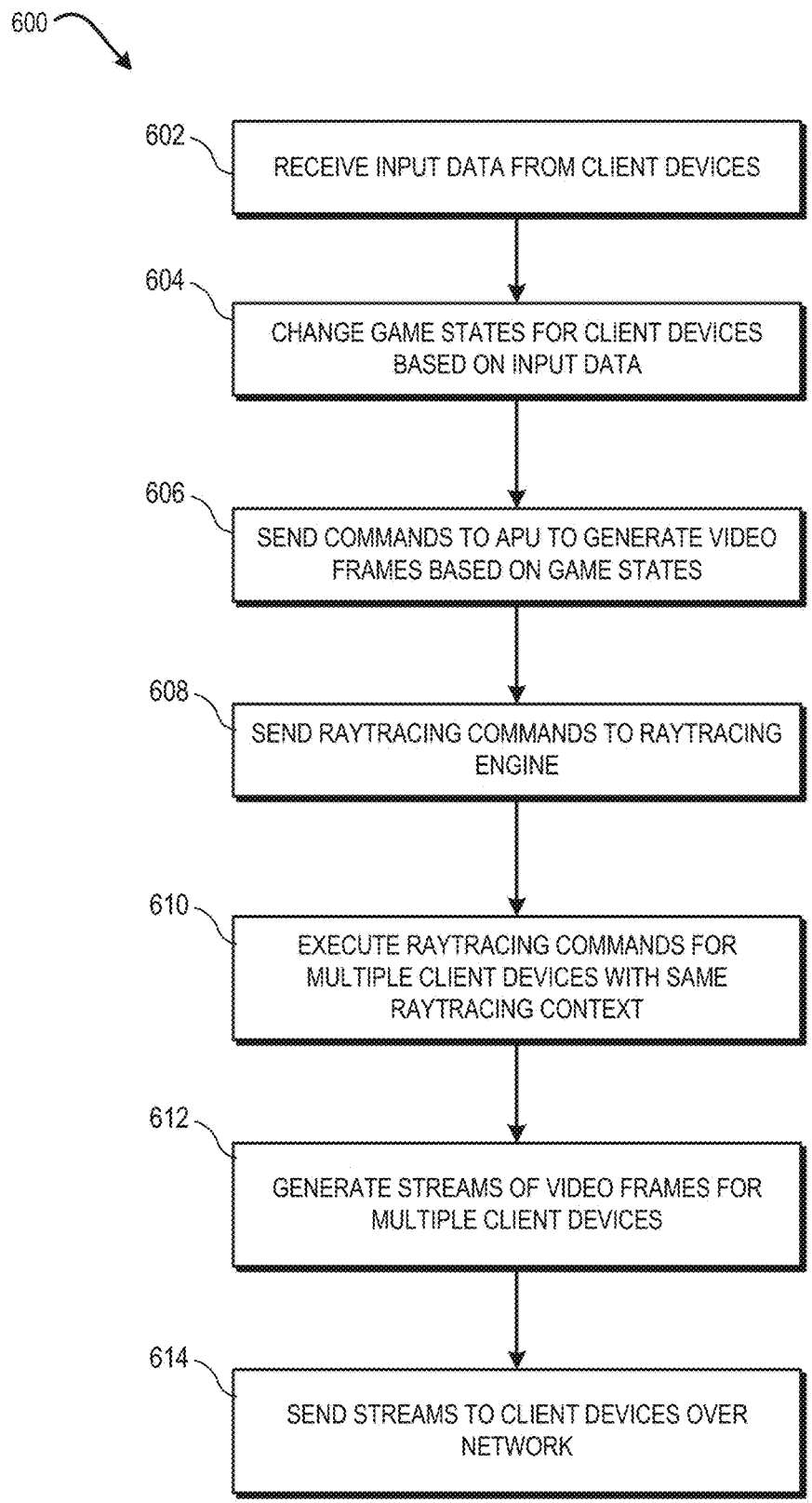
FIG. 6 is a flow diagram of a method of using a single raytracing context to generate video content for multiple client devices in accordance with some embodiments.

FIG. 6 illustrates a flow diagram of a method 600 of employing the same raytracing context to perform raytracing operations, and generate corresponding streams of video frames, for multiple client devices in accordance with some embodiments. The method 600 is described with respect to an example implementation at the system 100, and at the processing system 500. At block 602, the server 102 receives input data (e.g., input data 480 and 481) from the client devices 104 and 105. The input data for each client represents corresponding interactions with the video game program 108, such as input data indicating requested changes to a game environment (e.g., input to initiate a game session, input to change the position or viewpoint of a game character, input to change the position or status of a game object, and the like).

At block 604, the video game program changes the game state (e.g., game states 487 and 488) for each client device based upon the corresponding input data. For example, in some embodiments the video game program updates the game state for a client device to change a game character or game object position, change a game character viewpoint, a game character or object status, and the like, or any combination thereof). In at least some cases, the change in the game state causes the game program 108 to identify a required change in video frames being streamed to the corresponding client device. For example, a change in a character position or viewpoint requires, in some cases, a change in the video frames to reflect the character's new viewpoint or position. Accordingly, at block 606, the game program 108 generates, at the CPU 502, one or more commands (e.g., draw commands) to instruct the APU 514 to generate video frames for streaming, and sends the commands to the APU 514 via the bus 512.

At block 608, based on the received draw commands, the cores 516 of the APU 514 generate raytracing operations for each of the client devices 104 and 105. That is, in order to generate the video frames for the client devices 104 and 105 in response to the received draw commands, the cores 516 generate raytracing operations for each corresponding set of video frames. At block 610, the raytracing engine 110 executes the different raytracing operations for the different client devices 104, but using the same raytracing context 109. For example, in some embodiments the raytracing engine 110 uses the same BVH (e.g., BVH 220) to perform ray intersection testing for the client device 104 and to perform ray intersection testing for the client device 105. At block 612, the cores 516 of the APU 514 use the results of the corresponding raytracing operations to generate the streams 111 and 112. At block 614, the server 102 sends the streams 111 and 112 to the client devices 104 and 105, respectively, over the one or more networks 106.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
generating, based on a raytracing context, a first stream of frames for communication to a first client device; and
generating based on the raytracing context, a second stream of frames for communication to a second client device, different from the first client device.

2. The method of claim 1, wherein the raytracing context comprises a bounding volume hierarchy (BVH).

3. The method of claim 2, wherein:
generating the first stream of frames comprises traversing the BVH for the first client device; and
generating the second stream of frames comprises traversing the BVH for the second client device.

4. The method of claim 3, wherein:
traversing the BVH for the first client device comprises traversing the BVH based on first client state information associated with the first client device; and
traversing the BVH for the second client device comprises traversing the BVH based on second client state information associated with the second client device.

5. The method of claim 1, wherein the raytracing context comprises a scene graph.

6. The method of claim 1, wherein the raytracing context comprises a device driver.

7. The method of claim 1, wherein the raytracing context comprises at least one of geometry data and texture data.

8. A processing unit, comprising:
a memory to store a raytracing context; and
a processor to:
generate, based on the raytracing context, a first stream of frames for communication to a first client device; and
generate based on the raytracing context, a second stream of frames for communication to a second client device, different from the first client device.

9. The processing unit of claim 8, wherein the raytracing context comprises a bounding volume hierarchy (BVH).

10. The processing unit of claim 9, wherein the processor is to:
generate the first stream of frames by traversing the BVH for the first client device; and
generate the second stream of frames by traversing the BVH for the second client device.

11. The processing unit of claim 10, wherein:
traversing the BVH for the first client device comprises traversing the BVH based on first client state information associated with the first client device; and
traversing the BVH for the second client device comprises traversing the BVH based on second client state information associated with the second client device.

12. The processing unit of claim 8, wherein the raytracing context comprises a scene graph.

13. The processing unit of claim 8, wherein the raytracing context comprises a device driver.

14. The processing unit of claim 8, wherein the raytracing context comprises at least one of geometry data and texture data.

15. A processing system comprising:
a network interface to communicate with a first client device and a second client device via a network;
a memory to store a raytracing context; and
a processor to:

generate, based on the raytracing context, a first stream of frames for communication to the first client device; and generate based on the raytracing context, a second stream of frames for communication to the second client device, different from the first client device.

16. The processing system of claim 15, wherein the raytracing context comprises a bounding volume hierarchy (BVH).

17. The processing system of claim 16, wherein the processor is to:

generate the first stream of frames by traversing the BVH for the first client device; and generate the second stream of frames by traversing the BVH for the second client device.

18. The processing system of claim 17, wherein:

traversing the BVH for the first client device comprises traversing the BVH based on first client state information associated with the first client device; and traversing the BVH for the second client device comprises traversing the BVH based on second client state information associated with the second client device.

19. The processing system of claim 18, wherein the raytracing context comprises a scene graph.

20. The processing system of claim 18, wherein the raytracing context comprises a device driver.

* * * * *